(12) United States Patent
Sabet et al.

(10) Patent No.: US 9,104,521 B2
(45) Date of Patent: Aug. 11, 2015

(54) SYSTEM AND METHOD FOR REMOTE DEVICE APPLICATION UPGRADES

(75) Inventors: Sameh A. Sabet, Freehold, NJ (US); Jonathan M. Liss, Marlboro, NJ (US)

(73) Assignee: TYCO ELECTRONICS SUBSEA COMMUNICATIONS LLC, Morristown, NJ (US)

( * ) Notice: Subject to any disclaimer, the term of this patent is extended or adjusted under 35 U.S.C. 154(b) by 936 days.

(21) Appl. No.: 12/404,769

(22) Filed: Mar. 16, 2009

(65) Prior Publication Data
US 2010/0235824 A1 Sep. 16, 2010

(51) Int. Cl.
G06F 9/44 (2006.01)
G06F 9/445 (2006.01)
G06F 11/14 (2006.01)
G06F 11/20 (2006.01)

(52) U.S. Cl.
CPC ............ *G06F 8/665* (2013.01); *G06F 11/1433* (2013.01); *G06F 11/2005* (2013.01)

(58) Field of Classification Search
None
See application file for complete search history.

(56) References Cited

U.S. PATENT DOCUMENTS

| | | | |
|---|---|---|---|
| 5,008,814 A * | 4/1991 | Mathur | 709/221 |
| 5,210,854 A * | 5/1993 | Beaverton et al. | 717/174 |
| 5,477,264 A * | 12/1995 | Sarbadhikari et al. | 348/231.6 |
| 5,878,256 A * | 3/1999 | Bealkowski et al. | 713/2 |
| 5,881,236 A * | 3/1999 | Dickey | 709/221 |
| 5,930,504 A * | 7/1999 | Gabel | 713/2 |
| 5,940,074 A | 8/1999 | Britt, Jr. et al. | |
| 6,070,012 A * | 5/2000 | Eitner et al. | 717/168 |
| 6,253,281 B1 * | 6/2001 | Hall | 711/112 |
| 6,397,385 B1 | 5/2002 | Kravitz | |
| 6,425,125 B1 * | 7/2002 | Fries et al. | 717/168 |
| 6,536,038 B1 * | 3/2003 | Ewertz et al. | 717/168 |
| 6,546,455 B1 * | 4/2003 | Hurich et al. | 711/103 |
| 6,584,559 B1 | 6/2003 | Huh et al. | |
| 6,604,235 B1 * | 8/2003 | Harrison et al. | 717/168 |
| 6,622,246 B1 * | 9/2003 | Biondi | 713/100 |
| 6,640,317 B1 * | 10/2003 | Snow | 714/38.1 |
| 6,754,765 B1 * | 6/2004 | Chang et al. | 711/103 |

(Continued)

FOREIGN PATENT DOCUMENTS

| | | |
|---|---|---|
| WO | 2006060754 | 6/2006 |
| WO | 2006105472 | 10/2006 |

OTHER PUBLICATIONS

"Atmel AT29 Flash Memories", Atmel, 2002, <http://measure.feld.cvut.cz/groups/micro/soucastky/pameti/flash/!AT29_Flash_Memories.pdf>, pp. 1-4.*

(Continued)

*Primary Examiner* — Thuy Dao
*Assistant Examiner* — Samuel Hayim

(57) ABSTRACT

A method and system for remotely upgrading a remote device may be used to upgrade application programs in devices that are difficult to access physically, such as undersea optical devices in an optical communication system. The method and system uses a Non-Erasable Application (NEA) to manage the upgrade of an application program, to determine if the application program is valid, and to provide default application functions if the application program is not valid. The NEA may be stored on a memory that is not remotely erasable and the application program may be stored on a memory that is non-volatile and programmable. Code status indicators may be used to indicate if the application program is valid, for example, to indicate that the code is present and functional.

16 Claims, 5 Drawing Sheets

(56) References Cited

U.S. PATENT DOCUMENTS

| | | | | |
|---|---|---|---|---|
| 6,836,657 | B2 * | 12/2004 | Ji et al. | 455/419 |
| 6,925,467 | B2 * | 8/2005 | Gu et al. | 707/687 |
| 6,930,785 | B1 | 8/2005 | Weyand et al. | |
| 6,938,109 | B1 * | 8/2005 | Sliger et al. | 710/68 |
| 7,024,581 | B1 * | 4/2006 | Wang et al. | 714/2 |
| 7,062,763 | B2 * | 6/2006 | Ali-Santosa et al. | 717/168 |
| 7,089,547 | B2 * | 8/2006 | Goodman et al. | 717/168 |
| 7,093,244 | B2 * | 8/2006 | Lajoie et al. | 717/168 |
| 7,107,482 | B2 * | 9/2006 | Murai et al. | 714/6.31 |
| 7,219,261 | B2 * | 5/2007 | Tada et al. | 714/15 |
| 2002/0053073 | A1 * | 5/2002 | Shimamoto | 717/168 |
| 2002/0174422 | A1 | 11/2002 | Kelley et al. | |
| 2003/0163508 | A1 * | 8/2003 | Goodman | 709/100 |
| 2004/0015940 | A1 * | 1/2004 | Heisey et al. | 717/168 |
| 2004/0040019 | A1 * | 2/2004 | Ha | 717/168 |
| 2004/0117541 | A1 * | 6/2004 | Lei et al. | 711/103 |
| 2004/0143828 | A1 * | 7/2004 | Liu et al. | 717/168 |
| 2004/0168201 | A1 | 8/2004 | Tada et al. | |
| 2004/0237068 | A1 * | 11/2004 | Ren | 717/110 |
| 2004/0243991 | A1 * | 12/2004 | Gustafson et al. | 717/168 |
| 2004/0243992 | A1 * | 12/2004 | Gustafson et al. | 717/168 |
| 2005/0047326 | A1 | 3/2005 | Puon | |
| 2005/0071837 | A1 * | 3/2005 | Butt et al. | 717/168 |
| 2005/0097542 | A1 * | 5/2005 | Lee | 717/168 |
| 2005/0102669 | A1 * | 5/2005 | Marney et al. | 717/174 |
| 2005/0108288 | A1 | 5/2005 | Hartshorne | |
| 2005/0108700 | A1 * | 5/2005 | Chen et al. | 717/168 |
| 2005/0114852 | A1 * | 5/2005 | Chen et al. | 717/168 |
| 2005/0116835 | A1 * | 6/2005 | Grehant | 340/825.22 |
| 2005/0132351 | A1 * | 6/2005 | Randall et al. | 717/168 |
| 2005/0182851 | A1 * | 8/2005 | Buckler et al. | 709/238 |
| 2005/0204353 | A1 * | 9/2005 | Ji | 717/168 |
| 2005/0246701 | A1 * | 11/2005 | Kanapathipillai et al. | 717/168 |
| 2005/0268296 | A1 * | 12/2005 | Marolia et al. | 717/168 |
| 2006/0093367 | A1 | 5/2006 | Ekkizogloy | |
| 2006/0095903 | A1 * | 5/2006 | Cheam et al. | 717/168 |
| 2006/0112241 | A1 * | 5/2006 | Weiss et al. | 711/154 |
| 2006/0130046 | A1 * | 6/2006 | O'Neill | 717/168 |
| 2006/0174238 | A1 * | 8/2006 | Henseler et al. | 717/168 |
| 2006/0251115 | A1 * | 11/2006 | Haque et al. | 370/466 |
| 2006/0251423 | A1 * | 11/2006 | Evangelides et al. | 398/105 |
| 2007/0261049 | A1 * | 11/2007 | Bankston et al. | 717/170 |
| 2007/0261052 | A1 * | 11/2007 | Bale et al. | 717/174 |
| 2008/0037987 | A1 | 2/2008 | Bradley et al. | |
| 2008/0098388 | A1 * | 4/2008 | Gouder De Beauregard et al. | 717/174 |
| 2008/0126563 | A1 * | 5/2008 | Buckler et al. | 709/238 |
| 2008/0270677 | A1 * | 10/2008 | Kolakowski | 711/103 |
| 2009/0007091 | A1 * | 1/2009 | Appiah et al. | 717/171 |

OTHER PUBLICATIONS

Dennis K. Nilsson et al., "A Framework for Self-Verification of Firmware Updates over the Air in Vehicle ECUs", IEEE, 2008, <http://ieeexplore.ieee.org/stamp/stamp.jsp?tp=&arnumber=4746641>, pp. 1-5.*

Eran Gal et al., "Algorithms and Data Structures for Flash Memories", ACM, 2005, <http://delivery.acm.org/10.1145/1090000/1089735/p138-gal.pdf>, pp. 1-26.*

Optimal Flashing via FlexRay, Technical Article [Online], Vector, Nov. 2007 [retrieved on May 6, 2010]. Retrieved from the Intenet:<URL: http://www.vector.com/portal/medien/cmc/pressNector/FlashenFlexRay_ElektronikAutomotive_200711_PressArticle_EN.pdf>.

International Search Report and Written Opinion dated May 20, 2010 issued in related International Patent Application No. PCT/US10/27407.

Annex to Supplementary European Search Report, European Application No. 10753958.7, Report Filing Date Nov. 21, 2012.

* cited by examiner

SYSTEM AND METHOD FOR REMOTE DEVICE APPLICATION UPGRADES

TECHNICAL FIELD

The present disclosure relates to remotely upgrading device application programs and in particular, to a system and method for remotely upgrading an application program in a device with limited accessibility.

BACKGROUND

Undersea optical fiber transmission systems may include a relatively long trunk segment that may be terminated at a transmitting and/or receiving trunk terminal. The optical fiber transmission system may further include one or more optical devices, e.g., branching units and/or repeaters, situated along its trunk. Each branching unit (BU) may be connected to a branch segment that terminates in a transmitting and/or receiving branch terminal. Each trunk and/or branch terminal may be on or near dry land. The relatively long trunk system may run underwater, e.g., along an ocean floor. The optical devices may also be positioned on the ocean floor at a relatively long distance, e.g., fifty kilometers or more, from dry land. Each optical device may include a controller configured to control and/or monitor device functionality and/or communicate with a terminal. Such device functions may be implemented in software, firmware, hardware and/or a combination thereof.

From time to time, it may be desirable to upgrade the software, firmware and/or hardware in these remote devices. While hardware upgrades may require actual physical access to the device, software and/or firmware upgrades may be done remotely to maintain service. The capability of upgrading remotely may provide significant cost-savings when compared to activities that require physical access to these devices that are difficult to access physically due to the location, for example, in an undersea system. Remote upgrade capability may provide little benefit, however, if it merely precedes physical access because of a failed upgrade attempt. To preserve the cost-savings and service availability, it is therefore desirable that remote upgrades be reliable and allow recovery in the event of a failed upgrade.

Other challenges may also exist when transmitting application programs, such as firmware upgrades, from unreliable transmission facilities. For example, a low bandwidth transmission channel to the remote device may limit accessibility. The lack of continuous communication or protocol handshaking with a terminal may also limit the ability to verify every downloaded packet of a downloaded application and the ability to retransmit the application periodically.

BRIEF DESCRIPTION OF THE DRAWINGS

Reference should be made to the following detailed description which should be read in conjunction with the following figures, wherein like numerals represent like parts.

DETAILED DESCRIPTION

The present disclosure is directed to a system and method for remotely upgrading an application program, such as firmware, in a remote device with limited accessibility. The system and method generally uses a non-erasable application (NEA) to manage application upgrades and/or to provide default application functions, thereby providing relatively reliable remote application program upgrade capability. The system and method may be used in systems where physical access to system devices may be relatively difficult and/or costly, for example, in undersea optical communication systems as described below. Although an exemplary embodiment is described in the context of an undersea optical communication system, the systems and methods described herein may also be used in terrestrial communication systems.

Figure 1:
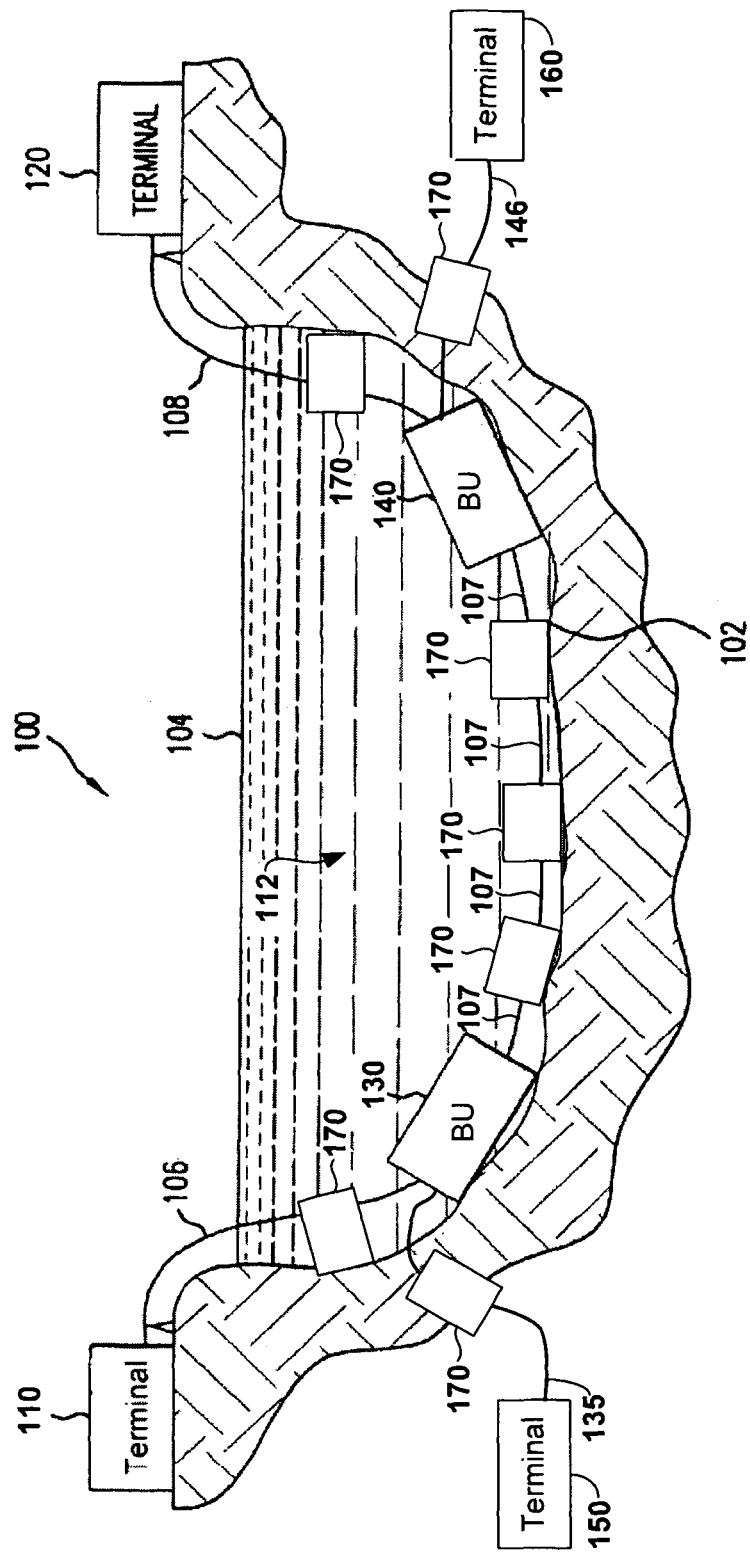
FIG. 1 is a schematic illustration of an optical communication system consistent with an embodiment of the present disclosure.

Turning now to FIG. 1, there is illustrated an exemplary optical communication system 100 consistent with the present disclosure. Those skilled in the art will recognize that the system 100 has been depicted in highly simplified form for ease of explanation. The optical communication system 100 includes trunk terminals 110, 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 106, 107, 108, for carrying optical signals. Each cable segment may include one or more sections of optical fiber cable including optical fiber pairs and one or more repeaters 170 to provide a transmission path for bi-directional communication of optical signals between the trunk terminals 110, 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, through an associated branch path 135, 146, respectively, perhaps through one or more repeaters 170 and linking optical cables. The system 100 may therefore be configured to provide bi-directional communication of optical signals between two or more terminals 110, 120, 150, 160. For ease of explanation, the description herein may refer to transmission from one terminal to another. The system 100 may be configured, however, for bi-directional or uni-directional communication between any of the terminals 110, 120, 150, 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

The optical communication system 100 may be configured as a long-haul system, e.g. having a length between at least two of the terminals of more than about 600 km, and may span a body of water. When used to span a body of water, e.g. an ocean, amplifiers 170 and/or branching units 130 and/or 140 may be seated on the ocean floor and the trunk path 112 path may span between beach landings. A plurality of repeaters, branching units and optical media links may be disposed beneath the water and/or over land.

One or more optical devices (e.g., branching units) in the optical communication system 100 may include an application program, such as firmware, which may be upgraded from time to time. When an optical device is positioned in or on an ocean floor, it may be desirable to upgrade the optical device remotely, i.e., from a terminal. It may also be desirable that the upgrade be performed with high reliability and that the optical device continue to function if the upgrade fails.

Figure 2:
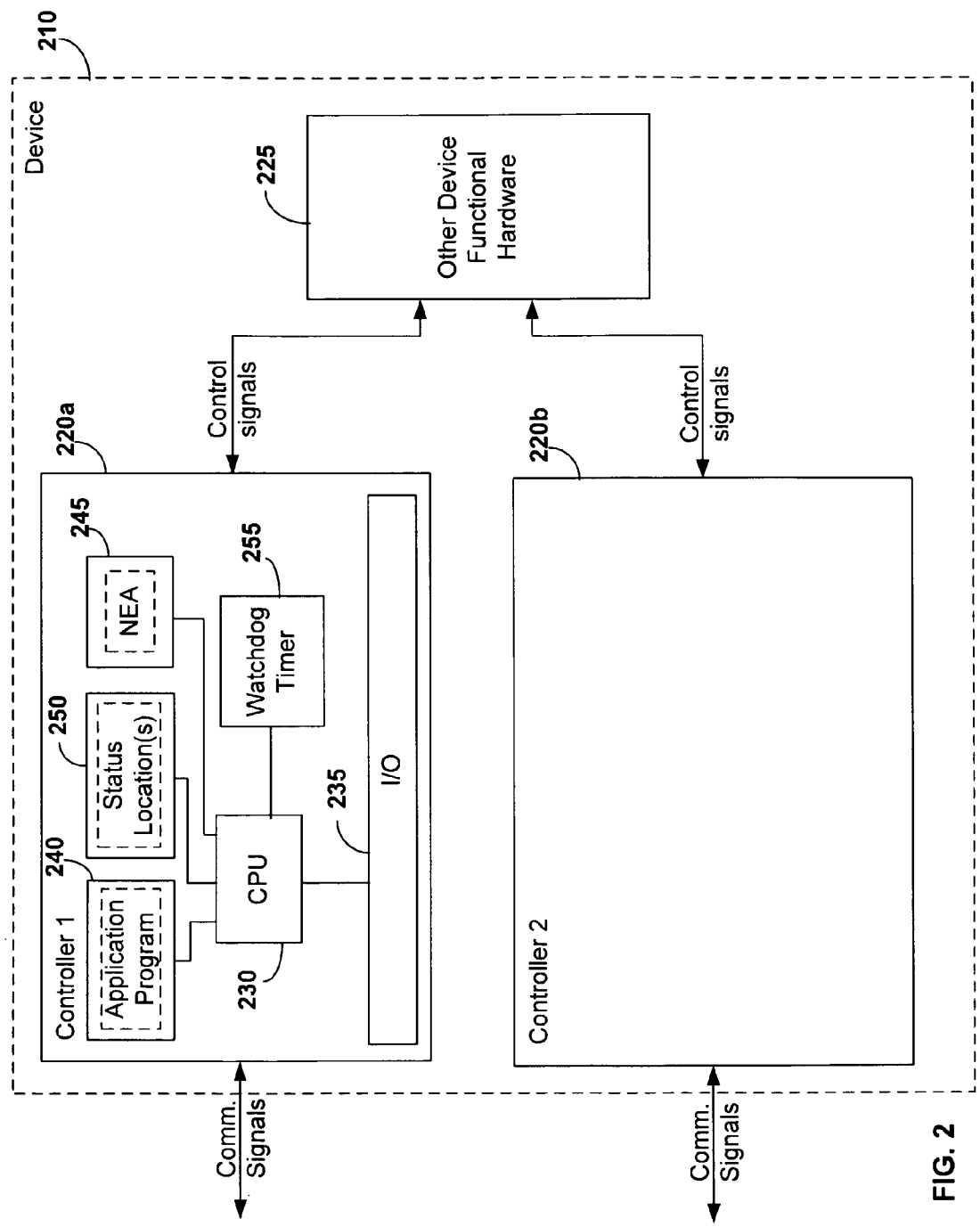
FIG. 2 is a block diagram of an embodiment of a device including a system for remote application upgrades.

Turning now to FIG. 2, an exemplary remote device 210, such as a branching unit or other undersea optical device, may have a remote application upgrade capability consistent with the present disclosure. Those skilled in the art will recognize that the device 210 has been depicted in highly simplified form for ease of explanation. The device 210 may include one or more controllers 220a, 220b. The term "controller" as used herein may include programmable hardware elements and/or a combination of hardware, software and firmware. For example, a controller may be a microcontroller, e.g., including a CPU, memory (e.g., read/write and/or read-only), and/or peripherals capable of input and output. In another example, a controller may be implemented as an ASIC, i.e., a "system on a chip", or an FPGA, or the like.

The device 210 may further include other device functional hardware 225. Other device functional hardware 225 may be hardware configured to provide, under control of a controller, a function of the device 210, e.g., repeater and/or branching function. The controllers 220a, 220b may be configured to receive and/or transmit communication signals from and/or to a terminal and/or another device, e.g., from/to terminals 110, 120, 150, 160, and/or another device 130, 140, 170. The controllers 220a, 220b may be further configured to receive and/or transmit control signals from/to other device functional hardware 225. In a device with a plurality of controllers, the controller 220a, 220b may be configured to provide redundant functionality. In other words, the controller 220a may be configured to provide the same device functionality as the controllers 220b, such that the device 210 may continue to function if one controller fails.

The device 210 may include one or more application programs configured to provide device functions, for example, by executing device commands. In the exemplary embodiment, a system for remotely upgrading the application program(s) in the device 210 may be implemented in at least one of the controllers 220a, 220b. In general, the controller 220a may include a processor or central processing unit (CPU) 230 coupled to a non-volatile, programmable memory 240 that stores the application program to be executed by the processor 230. The controller 220a may also include a non-erasable memory 245 that stores a non-erasable application (NEA) for managing application program upgrades and/or for providing default application functions. The controller 220a may further include a hardware timer, such as a watchdog timer 255, for resetting the processor if an upgraded application program cannot be validated within a period of time. Another memory 250 may be used to store program status indicators indicating whether an application program is valid (i.e., whether the upgrade is successful). The controller 220a may also include other components known to those skilled in the art, such as an input/output block (I/O) 235.

The non-volatile, programmable memory 240 for storing the application program may include an erasable programmable read-only memory (EEPROM) and more specifically a flash memory type EEPROM configured to be programmed in relatively large blocks. The EEPROM may be erasable and programmable so that a new or upgraded application program downloaded from a remote location (e.g., from a terminal) may replace an existing or previously programmed application program.

The non-erasable memory 245 may include memory that is configured to be programmed one time and not remotely erasable or programmable, such as read-only memory (ROM). Although the non-volatile, programmable memory 240 and the non-erasable memory 245 are shown and described as separate memory devices (e.g., an EEPROM and a ROM), the non-volatile, programmable memory 240 and the non-erasable memory 245 may also be implemented as separate portions of a single memory device (e.g., an EEPROM with the NEA stored in a protected code space of the EEPROM).

As mentioned above, the NEA may be configured to manage downloading a new application program and to manage erasing and/or programming the non-volatile programmable memory 240 (e.g., the EEPROM). The NEA may be further configured to provide bootloader and/or linker functions. As used herein, a bootloader may be understood as a program that is configured to run when a controller is reset and/or powered up. For example, the bootloader may be configured to load an application program into memory, "listen" for communication and/or jump to a starting location of an application. As used herein, a linker may be understood as a program that is configured to combine program modules and/or data to form a single program. The NEA may be further configured to provide device application functions and/or a default application, which provides device functionality when no valid application exists in the non-volatile, remotely erasable memory 240. In other words, the NEA may include a non-upgradeable version of the application program, which cannot be upgraded remotely.

The memory 250 for storing the program status indicators may include non-volatile memory, such as an EEPROM. The memory 250 may be a portion of a memory device together with one or both of the memories 240, 245 or may be a separate memory device. The memory 250 may include one or more memory locations configured to store the program status indicators. For example, the memory 250 may include a valid code location (VALID_CODE_LOC) configured to store a starting address of an application program, thereby indicating that the application program is present. VALID_CODE_LOC may be reset to indicate that a new application program is to be downloaded and may be set to a starting address of the new application program after the new application is downloaded, e.g., upon verification of the downloaded new application. The memory 250 may further include a code runvalid location (CODE_RUNVALID_LOC) configured to store a flag indicating that functionality of the application program has been validated. CODE_RUNVALID_LOC may be reset when VALID_CODE_LOC is reset to indicate that a new application program is to be downloaded and may be set upon validation of the functionality of the new application program.

The memory 250 may further include a code retries location (CODE_RETRIES_LOC) configured to store a counter of a number of attempts to validate the new application program. CODE_RETRIES_LOC may be reset to zero after a new application is downloaded and verified and may be incremented upon each attempt to validate the functionality of the new application. VALID_CODE_LOC may be reset based on a value stored in CODE_RETRIES_LOC, e.g., if the stored value exceeds a predetermined value (i.e., a retry number).

The memory locations and program status indicators are described in greater detail below in connection with the exemplary method for upgrading an application program.

If the device 210 includes redundant controllers 220a and 220b, the device 210 may be configured so that each controller 220a, 220b may be programmed independently of the other. This may provide both an increased level of functional reliability and an increased level of programming reliability when compared to a single controller system. For example, a device may continue to function if one controller fails. If a controller programming attempt fails, the device may also continue to function, either under control of the other controller or according to the default application of the NEA. An existing application may be upgraded in each of the plurality of controllers according to the methods discussed below. To maintain reliability, the upgrades may be performed one controller at a time, for example, sequentially. Although the redundant controllers provide advantages, this is not considered to be a limitation and the system and method for remote application upgrades may be implemented in a single controller.

Figures 3A, 3B:
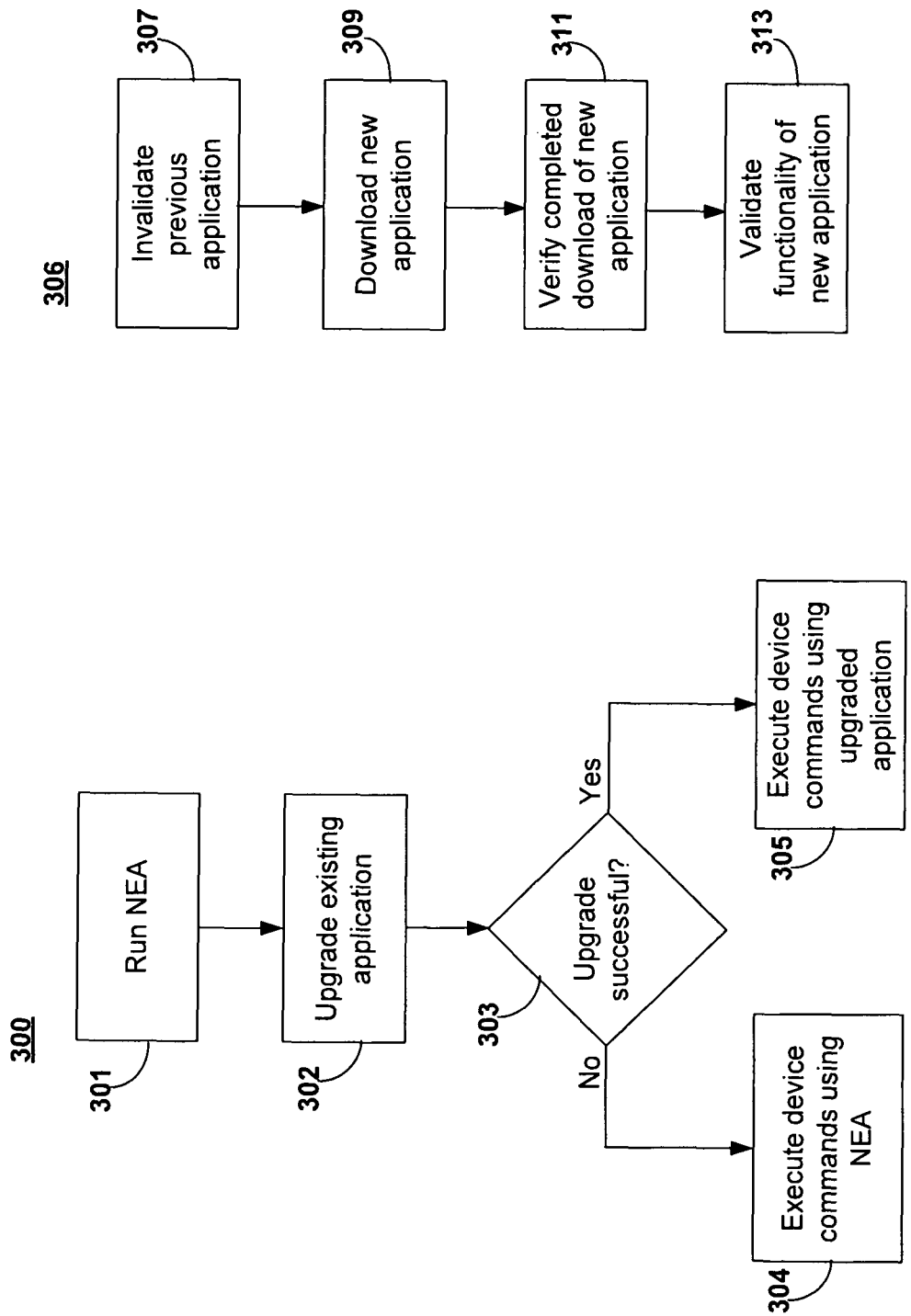
FIGS. 3A through 3C are flow charts illustrating methods for remotely upgrading application programs.

Turning now to FIG. 3A, the flow chart 300 illustrates one general method for remotely upgrading an application program, consistent with the present disclosure. In general, the NEA is run 301 and an existing application may then be upgraded 302 in a non-volatile, programmable memory (e.g., an EEPROM). The method also include determining 303 whether the upgrade was successful; for example, the NEA may check the program status indicators indicating the status of the application program. If the upgrade was not successful, device commands are executed 304 using the NEA, for example, to provide default application functions and/or to attempt another upgrade. If the upgrade was successful, device commands are executed 305 using the upgraded application.

Turning to FIG. 3B, the flow chart 306 illustrates an exemplary method for upgrading an existing application in greater detail. According to this exemplary method, an upgrade may begin with invalidating 307 an existing (i.e., previously programmed) application, for example, in response to a remote command. A new application may then be downloaded 309 and the completed download of the new application may be verified 311, e.g., by verifying one or more checksums. Verifying the checksum(s) may provide confirmation that the new application was not corrupted during the download process. The functionality of the new application may then be validated 313. Functionality of the new application may be validated by confirming that the new application performs a function such as communicating with a terminal or some other device and/or processing a command.

Invalidating 307 the previous application during an upgrade may include resetting program status indicators. As mentioned above, the program status indicators may be used to indicate that the completed download has been verified and that the functionality of the new application has been validated. After verification of a completed download, for example, an address of the new application program may be set in the valid code location (VALID_CODE_LOC). After validation of the functionality of the new application program, a flag may be set in the code runvalid location (CODE_RUNVALID_LOC). Invalidating 307 the previous application may then include resetting the valid code location (e.g., resetting the location VALID_CODE_LOC to 0xFFFFFFFF), resetting a code runvalid location (e.g., CODE_RUNVALID_LOC) to an invalid application flag, and resetting the controller. The existing application may be invalidated and/or the controller may be reset in response to an external command, i.e., a user command from a user located remote from a device, e.g., device 210. In an optical communication system, for example, the external command may be received over a relatively low bit rate telemetry channel.

Downloading 309 a new application may include receiving a new application program transmitted from, e.g., a terminal 110, 120, 150, 160, to the device 210. For speed considerations, a payload/message confirmation from the device 210 may be turned off during a download operation. The received application program may include a plurality of records. Each record may include an associated error check parameter, e.g., a checksum. Additionally or alternatively, the plurality of records (i.e., the entire application) may include an associated error check parameter. The non-volatile, programmable memory 240 may then be programmed with the received application program, for example, by burning application program into flash memory. After the new application program has been downloaded, payload and/or message confirmation may then be turned back on.

After the program has been downloaded, verifying 311 the downloaded new application may include receiving a user command to verify the checksum for the entire application. The user command may include a start address and an end address for the transmitted application program and a transmitted checksum for the transmitted application program. For example, the transmitted checksum may include a number (e.g., 16) of least significant bits of a sum of bytes corresponding to the transmitted application program. A programmed checksum may then be calculated based on the contents of the programmed non-volatile memory 240, between the start address and the end address, inclusive. The transmitted and programmed checksums may then be compared. If the compared checksums agree, the start address may then be stored at the valid code location (i.e., VALID_CODE_LOC) of the memory 250. The controller may then be reset in response to a user command.

After the downloaded program is verified, validating 313 the functionality of the new application program may include determining if the new application program is capable of performing a function within a period of time. According to one example, the application program may attempt to receive, process and respond to a user request to verify a version number of the application program during a period of time (e.g., a 2 minute window) enforced by the watchdog timer 255. If the application program fails to perform the function (e.g., does not receive the command, does not see the correct version number, or hangs up for any reason) within the period of time, the validation is deemed unsuccessful and the controller resets. If the application program performs the function within the period of time (e.g., confirms the correct version number within the 2 minute window), the flag is set in the code runvalid location (i.e., CODE_RUNVALID_LOC) indicating that functionality has been validated.

Figure 3C:
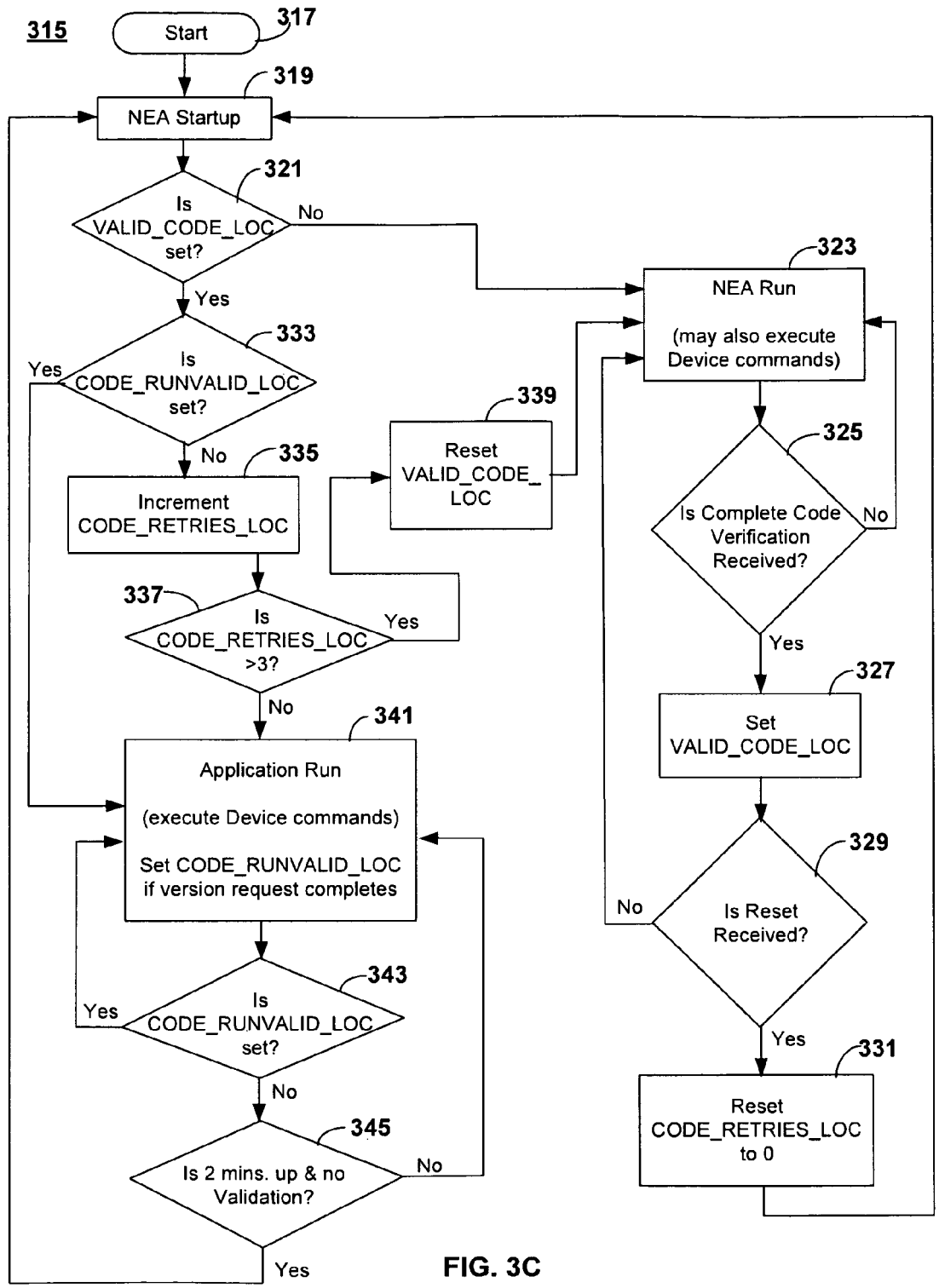

Turning now to FIG. 3C, an exemplary flow chart 315 illustrates in greater detail a program flow between an NEA and an application program from controller reset and/or device power up. As discussed above, the NEA may be configured to manage downloading a new application program, programming a non-volatile, programmable memory, verifying the downloaded new application and/or validating the new application program. The NEA may be further configured to provide bootloader functions, linker functions, and/or default application functions.

When the program flow begins 317, the NEA may start up 319. For example, a reset command from a user may cause the NEA to start up 319 and begin running. In another example, a device power up may cause the NEA to start up 319. Whether VALID_CODE_LOC is set may then be determined 321. If VALID_CODE_LOC is not set, indicating that no application program is present, then the NEA may run 323 to manage a new application program download operation and/or to provide default device functionality by executing device commands. After an attempted download operation, if a complete code verification has been received 325 (e.g., by verifying checksums), VALID_CODE_LOC may be set 327 to the starting address of the downloaded new application program. If complete code verification has not been received (e.g., if a downloaded application was corrupted and checksums did not match), flow may return to NEA run 323 to attempt another download and/or to execute device commands. After the VALID_CODE_LOC is set 327, the NEA may continue to run 323 until a reset command is received 329. If a reset command has been received, CODE_RETRIES_LOC may be reset 331 to zero and program flow may return to NEA startup 319.

If it is determined that VALID_CODE_LOC is set (e.g., to a starting address of an application program), whether CODE_RUNVALID_LOC is set may then be determined 333. If CODE_RUNVALID_LOC is set, the application program may run 341 and execute device commands. In other words, VALID_CODE_LOC being set and CODE_RUNVALID_LOC being set indicates that the new application program has been successfully downloaded and its functionality has been confirmed, i.e., the upgrade has been successful.

If CODE_RUNVALID_LOC is not set, CODE_RETRIES_LOC may be incremented 335. If it is determined 337 that CODE_RETRIES_LOC exceeds a retry number (e.g., 3), then VALID_CODE_LOC may be reset 339 (e.g., to 0xFFFFFFFF) to indicate that no application program is present and to initiate another download by running 323 the NEA. In other words, if CODE_RETRIES_LOC indicates that multiple attempts at validating functionality have failed, the application program may not be operational and another download may be required.

If CODE_RETRIES_LOC is less than the retry number (e.g., 3), then the application program may be run 341 to attempt to perform a function and validate functionality. If the application program successfully performs a function (e.g., a version request completes) when the application is running 341, CODE_RUNVALID_LOC may be set to indicate that functionality is validated. If CODE_RUNVALID_LOC is set 343, the application program may continue to run 341 and execute device commands. If CODE_RUNVALID_LOC is not set 343 and the timer has not timed out 345, the application program will continue to run 341 and attempt validation. If CODE_RUNVALID_LOC is not set 343 and the timer times out 345, the validation attempt has failed and the program flow may return to NEA Startup 319 and the validation sequence may be started again.

Figure 4:
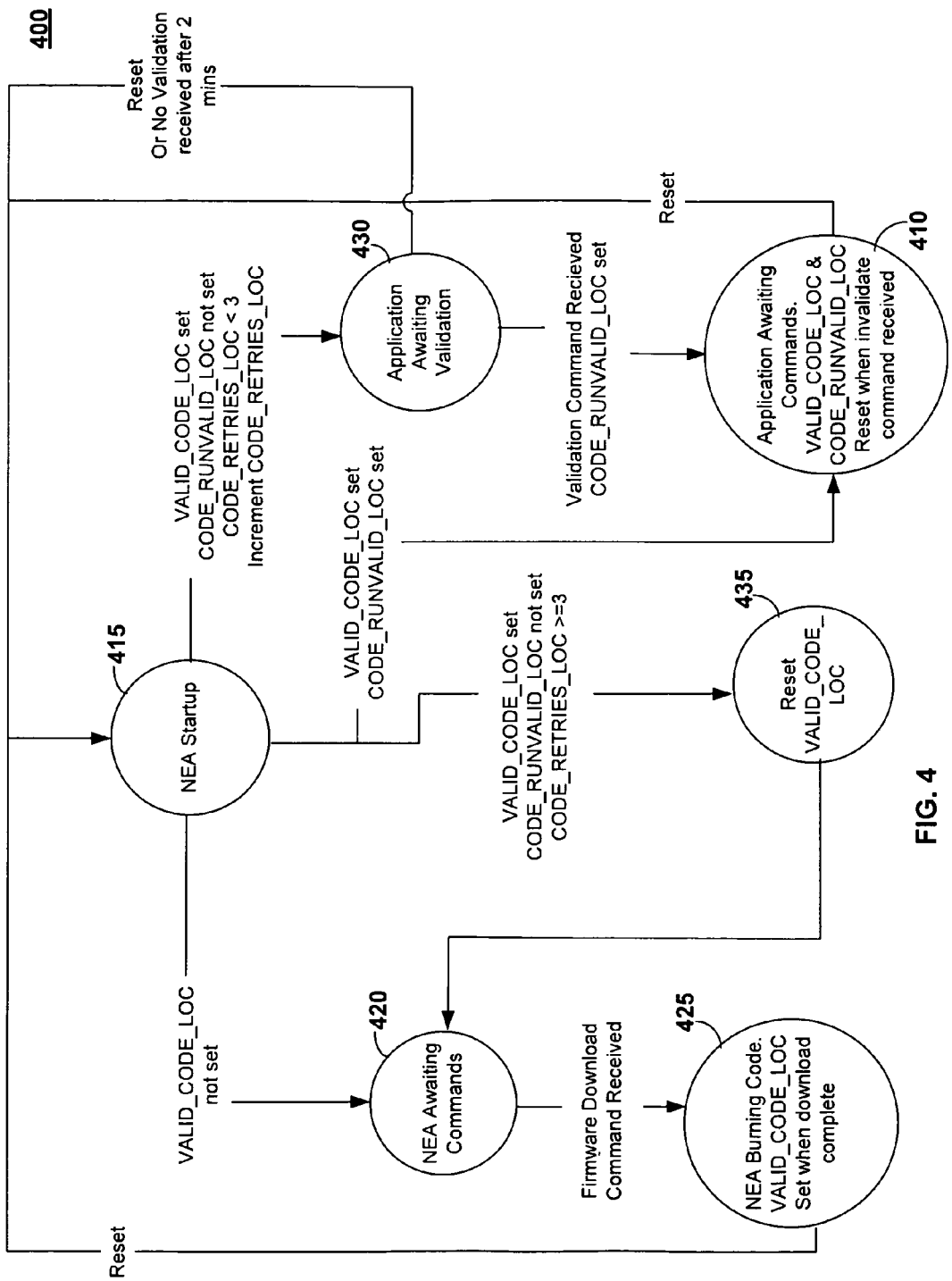
FIG. 4 is a state transition diagram illustrating an embodiment of a remote application upgrade consistent with the present disclosure.

Turning to FIG. 4, a state transition diagram 400 further illustrates the system and method of remotely upgrading an application program, consistent with the present disclosure. Initially, i.e., just prior to an application program upgrade operation, an application may be in an awaiting commands state 410. Upon receipt of an invalidate command (e.g., from a terminal), VALID_CODE_LOC may be reset, CODE_RUNVALID_LOC may be reset, a controller may be reset and the state may transition to NEA Startup state 415. If VALID_CODE_LOC is not set, the state may transition to NEA Awaiting Commands state 420. If a Firmware Download Command is received, the state may transition to NEA Burning Code state 425 where VALID_CODE_LOC may be set if the download completes and is verified. If a Reset occurs, the state may then transition to NEA Startup state 415. If VALID_CODE_LOC is set, CODE_RUNVALID_LOC is not set and CODE_RETRIES_LOC is less than a retry number (e.g., three), CODE_RETRIES_LOC may be incremented and the state may transition to Application Awaiting Validation state 430. If a Reset command is received and/or no Validation command is received and/or Validation is not successful after a period of time, e.g., two minutes, the state may transition to NEA Startup 415. If VALID_CODE_LOC is set, CODE_RUNVALID_LOC is not set and CODE_RETRIES_LOC is greater than or equal to the retry number, the state may transition to Reset VALID_CODE_LOC 435. The state may then transition to NEA Awaiting Commands 420. If at the NEA Startup state 415, VALID_CODE_LOC is set and CODE_RUNVALID_LOC is set, the state may transition to Application Awaiting Commands 410.

Accordingly, a system and method has been described that may provide high reliability software and/or firmware upgrades for remote devices that are difficult to access physically such as undersea fiber optical devices. An NEA may be provided that is configured to manage the download, to provide bootloader and/or linker functions, and to provide default device application functions in the event that the upgrade is not successful. Reliability may also be enhanced by a plurality of controllers configured to each download an upgrade, to verify that the download completed successfully and to validate that the downloaded upgrade is functional, i.e., the upgrade was successful.

According to one aspect of the present disclosure, there is provided a method of remotely upgrading a remote device including running a Non-Erasable Application (NEA) in the remote device, wherein the NEA is not remotely erasable; upgrading an application program in a non-volatile, programmable memory in the remote device; and executing device commands using the application program in the remote device if upgrading the application program is successful and executing device commands using the NEA in said remote device if upgrading the application program is unsuccessful.

According to another aspect of the disclosure, there is provided a system for remotely upgrading a remote device. The system includes a first memory including a Non-Erasable Application (NEA) stored therein such that the NEA is not remotely erasable. The NEA is configured to manage an upgrade of an application program in the remote device in response to a remote command, to determine if the application program is valid in the remote device, and to provide default application functions if the application program is not valid. The system also includes a second memory configured to store the application program therein, wherein the second memory is non-volatile and programmable. The system further includes a processor coupled to the first memory and the second memory, wherein the processor is configured to execute the NEA and is configured to execute the application program if the application program is valid.

According to yet another aspect of the disclosure, there is provided a communication system including a trunk terminal situated on land and configured to provide a signal on a trunk path; and a remote device coupled to the trunk path wherein the remote device is situated in a remote environment and is configured to be upgraded remotely. The remote device includes a controller configured to control a function of the remote device. The controller includes a first memory including a Non-Erasable Application (NEA) stored therein such that the NEA is not remotely erasable. The NEA is configured to manage an upgrade of an application program in the remote device in response to a remote command, to determine if the application program is valid in the remote device, and to provide default application functions if the application program is not valid. The controller also includes a second memory configured to store the application program therein, wherein the second memory is non-volatile and programmable. The controller further includes a processor coupled to the first memory and the second memory, wherein the processor is configured to execute the NEA and is configured to execute the application program if the application program is valid.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:

1. A method of remotely upgrading a remote device, comprising:
   managing download of an upgrade to an application program using a Non-Erasable Application (NEA) in said remote device, wherein said NEA is not remotely erasable and includes a non-upgradable version of said application program;
   upgrading said application program in a non-volatile, programmable memory in said remote device with said upgrade to provide an upgraded application program;
   determining whether said upgrading said application program was successful by validating functionality of said application program; and
   executing device commands to provide functions of the remote device using said upgraded application program in said remote device if upgrading said application program is successful; and
   executing said device commands using said NEA in said remote device if upgrading said application program is unsuccessful, whereby said NEA is configured execute the same ones of said device commands that would be executed by the upgraded application program if the upgrading the application program was successful by using the non-upgradable version of said application program,
   wherein upgrading said application program comprises:
   invalidating said application program using said NEA, and
   downloading and storing said upgraded application program in said non-volatile, programmable memory using said NEA after said invalidating said application program using said NEA,
   wherein a memory in said remote device includes at least a valid code location configured to store an address of said application program stored in said non-volatile, programmable memory, wherein invalidating said application program comprises resetting said valid code location to an invalid address,
   wherein said validating functionality of said upgraded application program comprises repeating validation attempts if functionality is not validated, and wherein said upgrading is repeated if functionality of said upgraded application program is not validated after a number of said validation attempts.

2. A method according to claim 1,
   said determining whether said upgrading said application program was successful comprises:
   verifying a completed download of said upgrade.

3. A method according to claim 2, wherein verifying said completed download of said upgrade comprises comparing at least one checksum.

4. A method according to claim 1, wherein validating functionality of said upgraded application program comprises determining whether said upgraded application program receives, processes and responds to a command.

5. A method according to claim 1, wherein validating functionality of said upgraded application program comprises determining whether said upgraded application program is functional within a period of time.

6. A method according to claim 1 wherein said determining whether said upgrading said application program was successful comprises determining if an address is set in said valid code location indicates that said upgraded application program is present and by determining if a flag is set in a code runvalid location indicating that said upgraded application program is functional.

7. A method according to claim 1, wherein said remote device includes first and second controllers, and wherein upgrading said application program is performed first for said first controller and second for said second controller.

8. A system for remotely upgrading a remote device, comprising:
   a first memory including a Non-Erasable Application (NEA) stored therein such that said NEA is not remotely erasable, and wherein said NEA is configured to manage an upgrade of an application program in said remote device in response to a remote command to provide an upgraded application program, said upgraded application program being configured to execute device commands to provide functions of the remote device, said NEA being further configured to determine if said upgraded application program is valid in said remote device-by validating functionality of said application program, and to cause execution of the same ones of said device commands that would be executed by the upgraded application program if the upgraded application program is valid by using a non-upgradable version of said application program if said upgraded application program is not valid;
   a second memory configured to store said upgraded application program therein, wherein said second memory is non-volatile and programmable; and
   a processor coupled to said first memory and said second memory, wherein said processor is configured to execute said NEA and is configured to execute said upgraded application program if said upgraded application program is valid,
   wherein said NEA is configured to manage said upgrade of said application program by invalidating said application program in said second memory, and downloading and storing said upgraded application program in said second memory after invalidating said application program,
   wherein a third memory in said remote device includes at least a valid code location configured to store an address of said application program in said second memory, wherein said NEA is configured to invalidate said application program in said second memory by resetting said valid code location to an invalid address,
   wherein validating functionality of said upgraded application program comprises repeating validation attempts if functionality is not validated, and wherein said upgrading is repeated if functionality of said upgraded application program is not validated after a number of said validation attempts.

9. The system according to claim 8 wherein said NEA is configured to verify a completed download of said upgrade program.

10. The system according to claim 8 wherein said third memory is configured to store at least one status indicator indicating a status of said upgraded application program in said second memory.

11. The system according to claim 8 wherein said third memory comprises a code runvalid location configured to store a flag indicating that said upgraded application program is functional.

12. The system according to claim 8 further comprising a hardware timer configured to reset said processor if said NEA fails to determine that said upgraded application program is functional after a period of time.

13. The system according to claim 8 wherein said NEA is configured to perform bootloader functions and linker functions for said remote device.

14. A communication system comprising:
- a trunk terminal situated on land and configured to provide a signal on a trunk path; and
- a remote device coupled to said trunk path, wherein said remote device is situated in a remote environment and is configured to be upgraded remotely, said remote device comprising:
- a controller configured to control a function of said remote device, wherein said controller comprises:
  - a first memory including a Non-Erasable Application (NEA) stored therein, wherein said NEA is not remotely erasable, and wherein said NEA is configured to manage an upgrade of an application program in said remote device in response to a remote command from said trunk terminal to provide an upgraded application program, said upgraded application program being configured to execute device commands to provide functions of the remote device, said NEA being further configured to determine if said upgraded application program in said remote device is valid by validating functionality of said application program, and to cause execution of the same ones of said device commands that would be executed by the upgraded application program if the upgrade application program is valid by using a non-upgradable version of said application program if said upgraded application program is not valid;
  - a second memory configured to store said upgraded application program therein, wherein said second memory is non-volatile and programmable; and
  - a processor coupled to said first memory and said second memory, wherein said processor is configured to execute said NEA and is configured to execute said upgraded application program if said upgraded application program is valid, wherein said NEA is configured to manage said upgrade of said application program by invalidating said application program in said second memory, and downloading and storing said upgraded application program in said second memory after invalidating said application program, wherein a third memory in said remote device includes at least a valid code location configured to store an address of said application program in said second memory, wherein said NEA is configured to invalidate said application program in said second memory by resetting said valid code location to an invalid address, wherein validating functionality of said upgraded application program comprises repeating validation attempts if functionality is not validated, and wherein said upgrading is repeated if functionality of said upgraded application program is not validated after a number of said validation attempts.

15. A communication system according to claim 14 wherein said remote device is an undersea optical device.

16. A communication system according to claim 14 wherein said third memory is configured to store at least one status indicator indicating a status of said upgraded application program in said second memory.

* * * * *